(12) United States Patent
Pikarski

(10) Patent No.: US 12,238,067 B2
(45) Date of Patent: Feb. 25, 2025

(54) AUTOMATICALLY GENERATING SECURITY RULES FOR A NETWORKED ENVIRONMENT BASED ON ANOMALY DETECTION

(71) Applicant: Perimeter 81 LTD, Tel-Aviv (IL)

(72) Inventor: Rony Pikarski, Netanya (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 309 days.

(21) Appl. No.: 17/548,673

(22) Filed: Dec. 13, 2021

(65) Prior Publication Data
US 2023/0188500 A1   Jun. 15, 2023

(51) Int. Cl.
*H04L 9/40* (2022.01)
*H04L 41/16* (2022.01)

(52) U.S. Cl.
CPC .......... *H04L 63/0263* (2013.01); *H04L 41/16* (2013.01); *H04L 63/1425* (2013.01)

(58) Field of Classification Search
CPC . H04L 63/0263; H04L 41/16; H04L 63/1416; H04L 63/1425; H04L 63/20
See application file for complete search history.

(56) References Cited

U.S. PATENT DOCUMENTS

| | | | |
|---|---|---|---|
| 11,636,213 B1 * | 4/2023 | Elgressy | H04L 63/0263 726/25 |
| 2017/0024660 A1 * | 1/2017 | Chen | G06N 5/045 |
| 2017/0214708 A1 * | 7/2017 | Gukal | G06F 16/285 |
| 2020/0236125 A1 * | 7/2020 | Wright | H04L 63/1425 |

* cited by examiner

*Primary Examiner* — Farid Homayounmehr
*Assistant Examiner* — Brian William Avery
(74) *Attorney, Agent, or Firm* — Rivka Friedman

(57) ABSTRACT

A computer implemented method of automatically generating security rules for a networked environment based on anomalies identified using Machine Learning (ML), comprising receiving one or more feature vectors each comprising a plurality of operational parameters of a plurality of objects of a networked environment, identifying one or more anomaly patterns in the networked environment by applying one or more trained ML models to the one or more feature vectors trained to identify patterns deviating from normal behavior of the plurality of objects, parsing each anomaly patterns to a set of behavioral rules by traversing the anomaly pattern through a tree-like decision model, and generating one or more security rules for the networked environment according to the set(s) of behavior rules. Wherein the one or more security rules are applied to increase security of the networked environment.

18 Claims, 6 Drawing Sheets

US 12,238,067 B2

AUTOMATICALLY GENERATING SECURITY RULES FOR A NETWORKED ENVIRONMENT BASED ON ANOMALY DETECTION

BACKGROUND

The present invention, in some embodiments thereof, relates to generating security rules for a networked environment and, more specifically, but not exclusively, to generating security rules for a networked environment based on anomalies detected using Machine Learning (ML).

With the ever advancing reliance on information technology for practically every aspect of modern day life, data security has become one of the major concerns and security practices, policies and principles are therefore continuously developed and deployed to ensure data security, safety and/or privacy.

Data security presents an even greater challenge in networked environments where a plurality of network nodes may connect to each other via networks that may be vulnerable and exposed to security threats, cyberattacks, malwares and a plurality of other activities maliciously initiated in attempt to compromise confidential, private, secure and/or sensitive data.

Since networking is a basic building block in many applications, services, platforms and/or systems, ranging from commercial and financial services to industrial, governmental and defense applications, major resources, effort, research and development is invested to constantly improve security of the network environments in attempt to increase security of the data transferred, accessed, and/or stored in such network environments.

SUMMARY

An objective of the embodiments of the disclosure is to provide a solution which mitigates or solves the drawbacks and problems of conventional solutions. The above and further objectives are solved by the subject matter of the independent claims. Further advantageous embodiments can be found in the dependent claims.

The disclosure aims at providing a solution for detecting anomalous behavior in a networked environment comprising a plurality of objects and/or members.

According to a first aspect of the present invention there is provided a computer implemented method of automatically generating security rules for a networked environment based on anomalies identified using Machine Learning (ML), comprising using one or more processors for:
  Receiving one or more feature vectors comprising a plurality of operational parameters of a plurality of objects of a networked environment.
  Identifying an anomaly pattern in the networked environment by applying one or more trained ML models to the one or more feature vectors. The one or more ML model is trained to identify patterns deviating from normal behavior of the plurality of objects.
  Parsing the anomaly pattern to a set of behavioral rules by traversing the anomaly pattern through a tree-like model.
  Generating one or more security rules for the networked environment according to the set of behavior rules;
Wherein the one or more security rules are applied to increase security of the networked environment.

According to a second aspect of the present invention there is provided a system for automatically generating security rules for a networked environment based on anomalies identified using Machine Learning (ML), comprising one or more processors configured to execute a code. The code comprising:
  Code instructions to receive one or more feature vectors comprising a plurality of operational parameters of a plurality of objects of a networked environment
  Code instructions identify an anomaly pattern in the networked environment by applying one or more trained ML model to the one or more feature vectors. The one or more ML model is trained to identify patterns deviating from normal behavior of the plurality of objects.
  Code instructions parse the anomaly pattern to a set of behavioral rules by traversing the anomaly pattern through a tree-like model.
  Code instructions generate one or more security rules for the networked environment according to the set of behavior rules;
Wherein the one or more security rules are applied to increase security of the networked environment.

In an optional implementation form of the first and/or second aspects, a visual representation of the set of behavioral is constructed.

In a further implementation form of the first and/or second aspects, the set of behavioral rules further defines a sequence of the behavioral rules of the set.

In a further implementation form of the first and/or second aspects, each of the plurality of objects is a member of a group consisting of: an application, a process, a thread, a network node, a user, a network connection, a network packet, and a log file.

In a further implementation form of the first and/or second aspects, the set of behavioral rules further defines a sequence of the behavioral rules of the set.

In a further implementation form of the first and/or second aspects, the one or more ML models are unsupervised learning ML models trained using a training dataset comprising a plurality of feature vectors each comprising a plurality of operational parameters of the plurality of objects expressing normal behavior of the plurality of objects.

In a further implementation form of the first and/or second aspects, the plurality of operational parameters of the plurality of objects expressing normal behavior are captured in the networked environment during a predefined time period.

In a further implementation form of the first and/or second aspects, the one or more ML models are further trained online after deployed to identify one or more anomaly patterns in the networked environment.

In a further implementation form of the first and/or second aspects, the tree-like model is constructed of a plurality of nodes arranged hierarchically in a plurality levels from a top most root node to a plurality of bottom most leaf nodes, the tree-like model includes a plurality of branches each representing a respective path traversed from the root node to a respective one of the plurality of leaf nodes, each of the plurality of nodes defines a respective condition applicable for one or more attributes of the anomaly pattern.

In a further implementation form of the first and/or second aspects, moving from a respective node of a respective level to one or more nodes of a next lower level is defined according to an outcome of the respective condition defined by the respective node, the outcome is a member of a group consisting of: true, false, further track, further check and further investigate.

In a further implementation form of the first and/or second aspects, the set of behavioral rules representing the anomaly pattern is derived from the nodes of the path traversed for the anomaly pattern along one or more branches of the tree-like model.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the Drawings.

DETAILED DESCRIPTION

Figure 1:
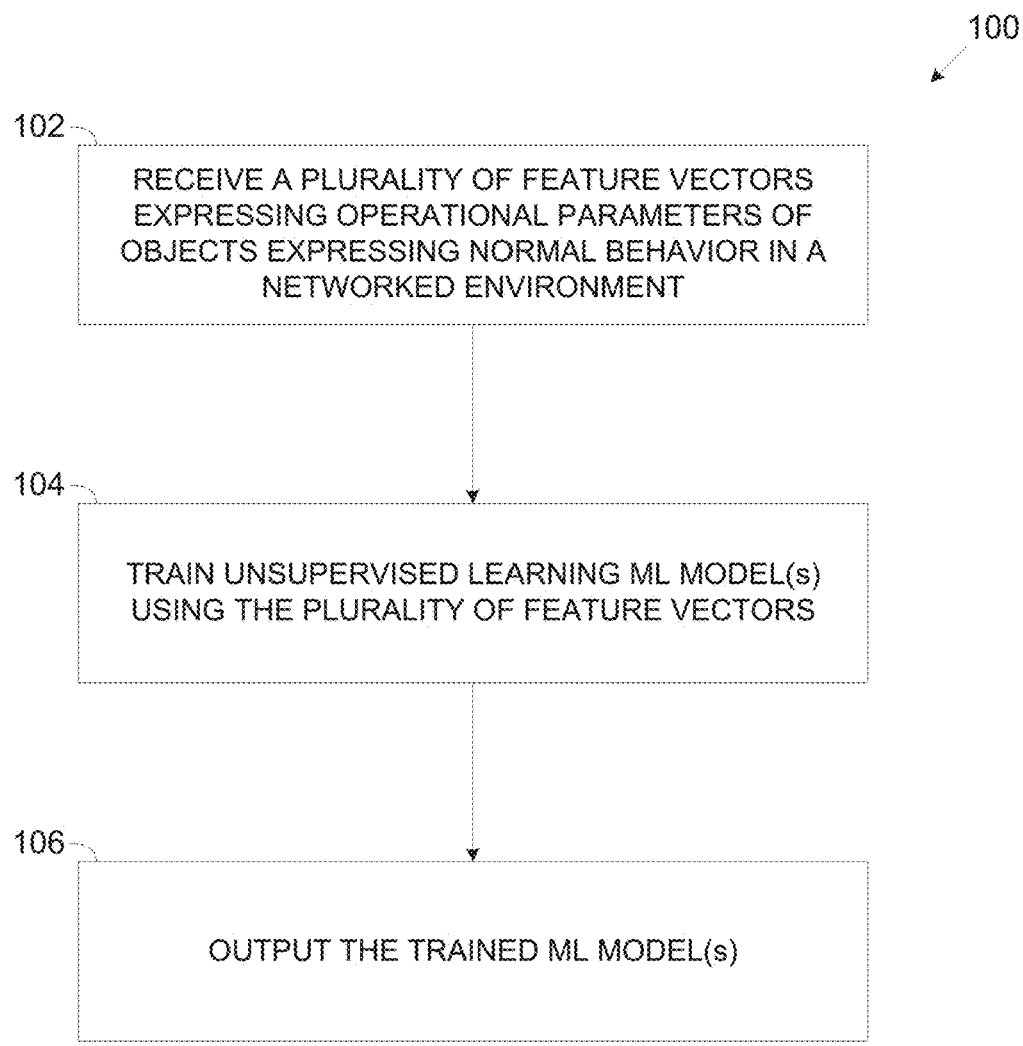
FIG. 1 is a flowchart of an exemplary process of training an ML model to detect anomalies in a networked environment, according to some embodiments of the present invention.

The present invention, in some embodiments thereof, relates to generating security rules for a networked environment and, more specifically, but not exclusively, to generating security rules for a networked environment based on anomalies detected using Machine Learning (ML).

According to some embodiments of the present invention, there are provided methods, systems and computer program products for detecting anomalies in a networked environment comprising a plurality of objects and/or members (collectively designated objects herein after), for example, network nodes, applications, processes and/or threads initiated by network nodes, users operating and/or using network nodes, network connections and/or links, data packets transmitted over network(s) of the networked environment, log files created and/or collected in the networked environment and/or the like.

The anomalies may be detected using one or more Machine Learning (ML) models, for example, unsupervised ML model(s) trained to learn normal behavior and/or operation of the networked environment and its objects. The ML models, for example, a neural network, a Convolutional Neural Network (CNN), a Recurrent Neural Networks (RNN), a Deep Neural Networks (DNN), a Modular Neural Networks (MNN), an autoencoder, a regularized autoencoder, a concrete autoencoder, a variational autoencoder, a support Vector Machine (SVM), a Bayesian network, a Density-based model, a Hidden Markov Model (HMM), an outlier detection model (e.g. cluster analysis, deviation from association, fuzzy logic) and/or the like may be trained in one or more unsupervised training sessions using a plurality of unlabeled training feature vectors. Each of the training feature vectors may comprise a plurality of features expressing operational parameters one or more of the objects of the networked environment, specifically operational parameters captured during normal operation of the objects in the networked environment.

During the training session(s), based on the training feature vectors expressing normal behavior operational parameters detected in the networked environment, the ML model(s) may adapt, adjust, evolve and/or otherwise learn to identify patterns of normal behavior in the networked environment. The ML model(s)'s adaptation and adjustment may include, for example, structural adjustments, layers count, layers type, layers connections, nodes assignment, edges routing and/or the like. In another example, the ML model(s)'s adaptation and adjustment may include adjustment of weights assigned to one or more of the edges connecting the nodes of the ML model(s).

After trained, the trained ML model(s) may be deployed to identify one or more anomalies in the networked environment, specifically anomaly patterns deviating from the normal behavior patterns learned by the trained ML model(s) which may be indicative of potential threats, vulnerability exploitation, compromising of network resources and/or the like.

In particular, the trained ML model(s) may be applied to analyze one or more new feature vectors previously unseen by the ML model(s) which may comprise features expressing one or more operational parameters (values) captured in the networked environment for one or more of the objects. In case the pattern identified by the ML model(s) based on one or more of the new feature vectors deviates from the normal behavior patterns, the ML model(s) may determine that the pattern may be indicative of one or more anomalies in the networked environment.

Optionally, after deployed, the trained ML model(s) may be further trained using one or more new feature vectors expressing operational parameters captured in the networked environment after the deployment. The trained ML model(s) may therefore further evolve and adapt to learn one or more new behavior patterns of the objects in the networked environment which may comprise one or more normal behavior patterns and/or one or more anomaly patterns. Moreover, the trained ML model(s) may be combined with one or more other models configured and/or trained to detect and/or learn normal behavior of the networked environment.

Each detected anomaly pattern may be then analyzed to identify, determine and/or explore its characteristics. For example, the anomaly pattern may be parsed to create a set of behavioral rules expressing, representing and/or demonstrating the anomaly pattern. The set of behavioral rules may optionally further include a sequence of the behavioral rules to form an ordered set in which the behavioral rules are ordered according to one or more parameters, for example, timing (i.e., time of occurrence), priority, significance and/or the like.

One or more methods, techniques and/or algorithms may be applied for parsing the anomaly patterns. For example, the anomaly pattern may traverse through a tree-like model forming a decision tree which may be used to more clearly define and/or explain the anomaly patterns detected by the ML model(s).

The tree-like model may be constructed of a plurality of decision nodes arranged hierarchically in a plurality levels starting from a top most root node and extending down to a plurality of bottom most leaf nodes. Each decision node of the tree-like structure may define a respective condition (test) applicable for one or more attributes of the anomaly patterns traversed down the tree-like model, specifically of values of one or more of the operational parameters included, expressed and/or defined by the anomaly patterns. The Moving from one node (source node), specifically from a higher level node down to one or more next lower level nodes (destination nodes) may be defined by an outcome (result), for example, true or false of the condition defined by the source node. The tree-like model may therefore include a plurality of branches each representing a respective path traversing from the root node to a respective one of the plurality of leaf nodes.

As such, while the anomaly pattern traverses down the tree-like mode and traversing the nodes, the condition defined by each traversed node may be applied to the anomaly pattern and based on the outcome of each condition, the anomaly pattern may be traverse the tree-like model starting from the root node until reaching one or more of the leaf nodes.

The set of behavioral rules expressing the nodes traversed by the anomaly pattern may be thus derived and/or inferred from the conditions defined by the traversed nodes and the outcomes to these conditions. Specifically, the set of behavioral rules may express the linearized sequence of conditions of the traversed nodes which may thus define the anomaly pattern.

One or more security rules may be generated for the networked environment according to one or more sets of behavior rules expressing and/or representing one or more of the detected anomaly patterns. The security rules created to define the detected anomalies and optionally overcome, limit and/or prevent one or more of the detected anomalies may target one or more devices, systems and/or apparatuses deployed in the networked environment, for example, a switch, a gateway, a router, a firewall, a network node and/or the like in order to increase security, safety, robustness, privacy and/or the like of the networked environment.

Optionally, one or more of the detected anomaly patterns, specifically the set of behavior rules expressing and/or representing the detected anomaly pattern(s) may be visualized to one or more human users, for example, an Information Technology (IT) person, a network manager and/or the like. The visualization may be done by constructing one or more multi-dimensional visual views which may express the detected anomaly pattern(s) and/or the constructed security rule(s) which may indicate and/or define the anomaly pattern(s).

Automatically creating security rules for a networked environment based on sets of behavioral rules expressing anomaly patterns detected in the networked environment using trained ML model(s) may present major advantages and benefits compared to exiting systems and methods for creating such security rules.

First, manual analysis of the networked environment's behavior in attempt to detect deviations and potential anomalies as may be done by the existing methods may be highly inefficient, extremely time and resource consuming due to the enormous volumes of data captured in the networked environment which need to be analyzed. Automatically analyzing the operational parameters of the objects and members of the networked environment and generating security rules accordingly may therefore significantly increase efficiency of the analysis to produce more robust security rules which may significantly increase security, safety and/or privacy of the networked environment. Automatic detection of anomalies and automatic generation of security rules accordingly may also significantly reduce time required for generating the rules which may significantly reduce utilization of computing resources (e.g. processing resources, storage resources, networking resources, etc.).

Moreover, since the ML model(s) are adjustable and learnable, during the training session(s) and optionally after deployment, the ML model(s) may adapt to learn the specific normal behavioral and operation patterns of each specific networked environment thus highly efficient for each individual networked environment as opposed to general anomaly detection in a plurality of networked environment as may be done by the existing methods. Such general anomaly detection may be very limited and significantly less accurate than the specific adaptation to each networked environment since different networked environments may greatly differ from one another in their normal and/or typical behavior and operation. Moreover, since they are further trained after deployment, the ML model(s) may efficiently to adapt to new normal behavioral patterns detected in the networked environment a feature which may be highly limited in the static existing methods, Furthermore, since the ML model(s) are trained to learn the normal behavior and operation of the objects and/or members of the networked environment, the ML model(s) may detect anomalies which be indicative of previously unseen and/or unknown threats by detecting deviation from the normal behavior patterns. This is in contrast to the existing methods which may be trained and/or learned to identify known anomalies, threats and/or attacks and may be therefore limited in their ability to detect and identify new and previously unknown threats.

In addition, using the tree-like model to creating a set of behavioral rules expressing each detected anomaly which may be indicative of potential threats and/or vulnerabilities, may enable accurate characterization of each anomaly pattern and automatically generating effective security rules based on the specific characteristics of the detected anomaly to effectively enhance security of the networked environment and/or part thereof.

Finally, visualizing the anomaly pattern(s) to human users may enable the human users to efficiently comprehend and understand the anomaly and/or the sets of behavioral rules expressing the detected anomaly patterns which may be highly complex and incompressible. While it may be very difficult and potentially impossible for human users to understand the anomaly pattern detected by the trained ML model(s), the users may significantly easy comprehend and grasp the security rules created according to the set of behavioral rules which may define the detected anomaly. Visualizing the security rules and/or the sets of behavioral rules may pattern(s) may further increase conception of the anomaly patterns by the human users.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of training an ML model to detect anomalies in a networked environment, according to some embodiments of the present invention.

An exemplary process 100 may be executed to train one or more ML models, for example, unsupervised ML model (s) to learn normal behavior of a networked environment by training the ML model(s) using training samples expressing operational parameters of a plurality of objects of the networked environment captured during normal operation of the objects.

The objects of the networked environment may include practically any member, object, traffic, connection, process and/or the like which may connect, execute, instantiate and/or the like in the networked environment, for example, one or more network nodes, one or more applications and/or processes executed by one or more of the network nodes, one or more threads initiated in one or more of the network nodes, one or more users operating and/or using one or more of the network nodes, one or more network connections and/or links established in the, one or more data packets transmitted over one or more networks of the networked environment and/or the like.

After trained, the trained ML model(s) may be deployed to identify one or more anomalies in the networked environment by detecting deviations of values of one or more of the operational parameters of one or more of the objects of the networked environment.

Figure 2:
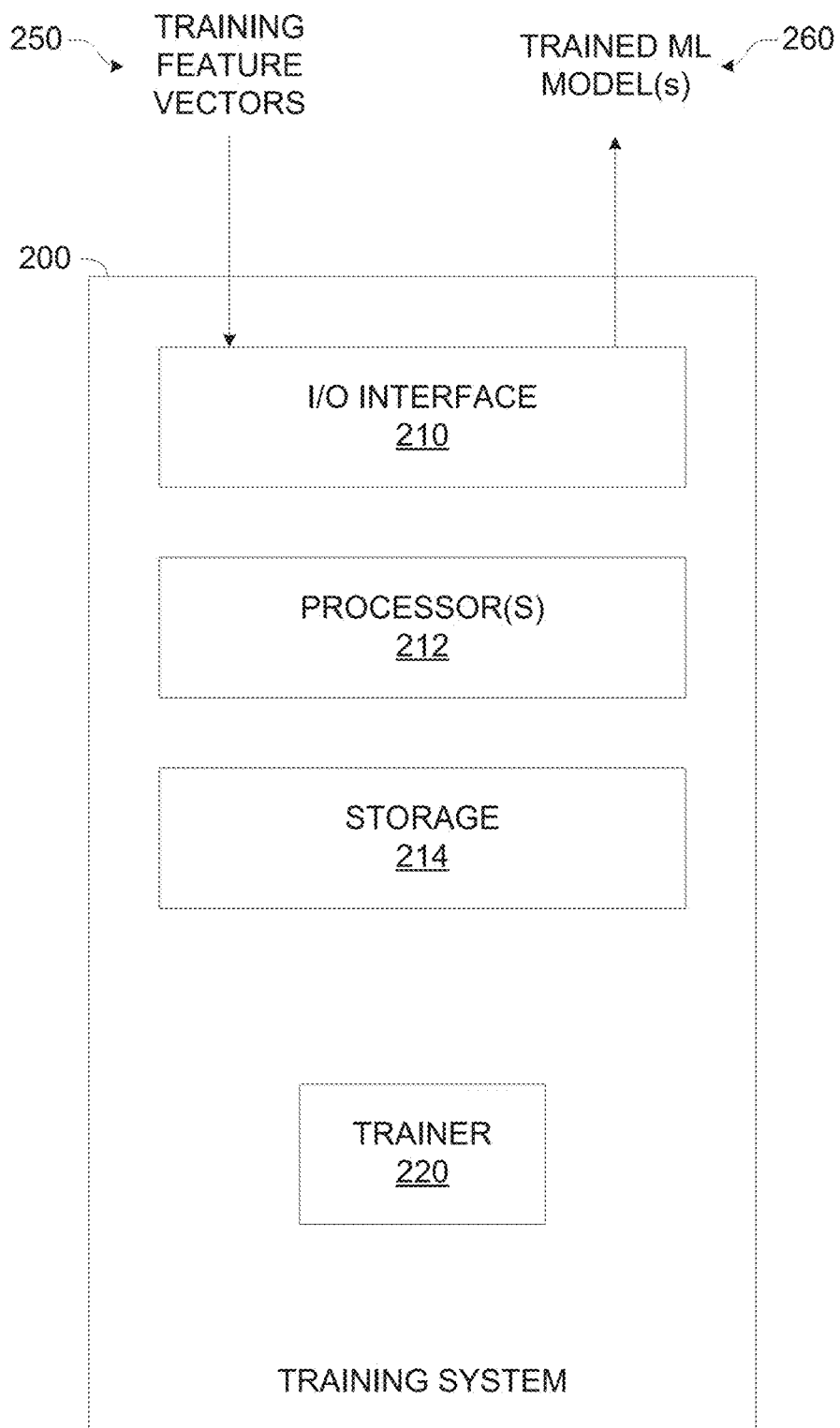
FIG. 2 is a schematic illustration of an exemplary system for training an ML model to detect anomalies in a networked environment, according to some embodiments of the present invention.

Reference is also made to FIG. 2, which is a schematic illustration of an exemplary system for training an ML model to detect anomalies in a networked environment, according to some embodiments of the present invention.

An exemplary training system 200 may comprise an Input/Output (I/O) interface 210, a processor(s) 212 for executing a process such as the process 100 and a storage 214 for storing code (program store) and/or data.

The I/O interface 210 may comprise one or more wired and/or wireless interfaces, for example, a Universal Serial Bus (USB) interface, a serial interface, a Radio Frequency (RF) interface, a Bluetooth interface and/or the like. The I/O interface 210 may further include one or more network interfaces for connecting to one or more wired and/or wireless networks, for example, a Local Area Network (LAN), a Wireless Local Area Network (WLAN), a Wide Area Network (WAN), a Municipal Area Network (MAN), a cellular network, the internet and/or the like.

Via the I/O interface 210, the training system 200 may receive a plurality of feature vectors 250 which may be used for training one or more ML models 260. Moreover, via the I/O interface 210, the training system 200 may output, for example, transmit, provide, store and/or the like one or more of the trained ML model(s) 260.

The processor(s) 212, homogenous or heterogeneous, may include one or more processing nodes arranged for parallel processing, as clusters and/or as one or more multi core processor(s). The storage 214 may include one or more non-transitory memory devices, either persistent non-volatile devices, for example, a hard drive, a solid state drive (SSD), a magnetic disk, a Flash array and/or the like and/or volatile devices, for example, a Random Access Memory (RAM) device, a cache memory and/or the like. The storage 314 may further include one or more network storage resources, for example, a storage server, a network accessible storage (NAS), a network drive, a cloud storage and/or the like accessible via the I/O interface 210.

The processor(s) 212 may execute one or more software modules, for example, a process, a script, an application, an agent, a utility, a tool, an Operating System (OS) and/or the like each comprising a plurality of program instructions stored in a non-transitory medium such as the storage 214 and executed by one or more processors such as the processor(s) 212. The processor(s) 212 may further include, integrate and/or utilize one or more hardware modules available in the training system 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator and/or the like.

As such, the processor(s) 212 may execute one or more functional modules, for example, a trainer 220 utilized by one or more software modules, one or more of the hardware modules and/or a combination thereof for executing the process 100.

Optionally, the training system 200 and/or the trainer 220 may be provided, executed and/or utilized at least partially by one or more cloud computing services, for example, Infrastructure as a Service (IaaS), Platform as a Service (PaaS), Software as a Service (SaaS) and/or the like provided by one or more cloud infrastructures and/or services such as, for example, Amazon Web Service (AWS), Google Cloud, Microsoft Azure and/or the like.

As shown at 102, the process 100 starts with the trainer 220 receiving a plurality of feature vectors 250 for training the ML model(s) 260, for example, a neural network such as, for example, a convolutional Neural Network (CNN), a Recurrent Neural Networks (RNN), a Deep Neural Networks (DNN), a Modular Neural Networks (MNN), an autoencoder, a regularized autoencoder, a concrete autoencoder, a variational autoencoder, an SVM, a Bayesian network, a Density-based model, an HMM, an outlier detection model (e.g. cluster analysis, deviation from association, fuzzy logic) and/or the like.

Each feature vector 250 may comprise one or more features expressing, comprising, corresponding and/or otherwise relating to one or more of a plurality of operational parameters of one or more of a plurality of objects of the networked environment, for example, a value of an operational parameter, a combination and/or aggregation of values of multiple operational parameters and/or the like.

The objects of the networked environment may include, for example, one or more network nodes, one or more applications and/or processes executed by one or more of the network nodes, one or more threads initiated in one or more of the network nodes, one or more users operating and/or using one or more of the network nodes, one or more network connections and/or links established in and/or with the networked environment, one or more data packets transmitted over one or more networks of the networked environment, one or more log files created and/or collected in the networked environment and/or the like.

The operational parameters relating to the objects may naturally depend on the type of the object, the object's functionality, the objects behavior and/or the like. For example, the operational parameters relating to one or more of the network nodes in the networked environment may comprise, for example, a power consumption, an execution load, a network load, a storage utilization, type of executed application(s), process(s) and/or thread(s) and/or the like.

In another example, the operational parameters relating to one or more of the applications, processes and/or threads initiated, executed and/or run by one or more of the network nodes of the networked environment may comprise, for example, a type, a timing, a priority, a mode, authorization, input/output data and/or the like.

In another example, the operational parameters relating to one or more of the users using one or more of the network nodes in the networked environment may comprise, for example, identity, credentials, access mode (i.e., which network node(s), network(s), wireless access point(s) are used by the user, etc.), activity type (e.g. which applications, services, are accessed by the user, etc.), access time (e.g., hour, day, week, month, etc.), session duration and/or the like.

In another example, the operational parameters relating to the network resources of the networked environment may include, for example, number of network connections (links), attributes of the connections (e.g. speed, negotiation, etc.), network traffic patterns (e.g. load, utilized bandwidth, type, timing, etc.), communication and networking protocols employed for transmitting data packets in the networked environment and/or the like.

In another example, the operational parameters relating to one or more of the data packets transmitted in the networked environment may include, for example, protocol, source and/or destination addresses, frequency, transfer error and/or the like.

In another example, the operational parameters relating to one or more of the log file created, collected, logged and/or recorded in the networked environment may include, for example, number of events, events type, events distribution, events timing, events sequence and/or the like.

The features in each of the feature vectors 250 may therefore express values for a plurality of the operational parameters captured, logged and/or recorded in the networked environment over a predefined time period.

In particular, the feature vectors 250 used for training the ML model(s) 260 may comprise features expressing normal behavior operational parameters of the objects of the networked environment, i.e. values captured, logged and/or recorded in the networked environment during normal and/or typical operation and behavior of the objects over a predefined time period sufficient to establish typical behavior and characterize the normal behavior operational parameters.

As shown at 104, the trainer 220 may use the training feature vectors 250 which may typically be unlabeled to train the ML model(s) 260 in one or more training session, for example, unsupervised training sessions by feeding the training feature vectors 250 to the ML model(s) 260.

During the training session(s), the ML model(s) 260 may adapt, adjust, evolve and/or otherwise learn to identify patterns of normal behavior in the networked environment based on the training feature vectors 250 expressing the normal behavior operational parameters. The adaptation, adjustment, evolution and learning of the ML model(s) 260 may include, for example, structural adjustments, for example, layers number, layers type, layers connections, nodes assignment, edges routing and/or the like. In another example, the adaptation, adjustment, evolution and learning of the ML model(s) 260 may include adjustment of weights assigned to one or more of the edges connecting the nodes of the ML model(s) 260.

As shown at 106, the trainer 220 may output the trained ML model(s) 260 which may be used by one or more systems, devices, platforms and/or services to identify one or more anomalies, specifically anomaly patterns in the networked environment which deviate from the normal behavior patterns expressing the normal operational and/or behavior of the networked environment learned by the trained ML model(s) 260.

The trainer 220 may output the trained ML model(s) 260 using one or more techniques and/or modes. For example, the trainer 220 may locally store the trained ML model(s) 260 in the training system 200, for example, in the storage 214 optionally for future use by the training system 200. In another example, the trainer 220 may store the trained ML model(s) 260 in one or more attachable storage media devices (e.g. memory stick, etc.) attached to the I/O interface 210 such that the attachable storage media device(s) may be distributed to one or more other systems configured to use the trained ML model(s) 260. In another example, the trainer 220 may transmit the trained ML model(s) 260, via one or more of the networks the training system 200 is connected to via the I/O interface 210, to one or more other systems configured to use the trained ML model(s) 260.

Optionally, after deployed to detect anomaly patterns in the networked environment, the trained ML model(s) 260 may be further trained as described in the process post deployment using one or more new feature vectors expressing operational parameters captured in the networked environment after the deployment. The trained ML model(s) 260 may therefore further evolve and adapt to learn one or more new behavior patterns of the objects in the networked environment which may comprise one or more normal behavior patterns and/or one or more anomaly patterns.

Figure 3:
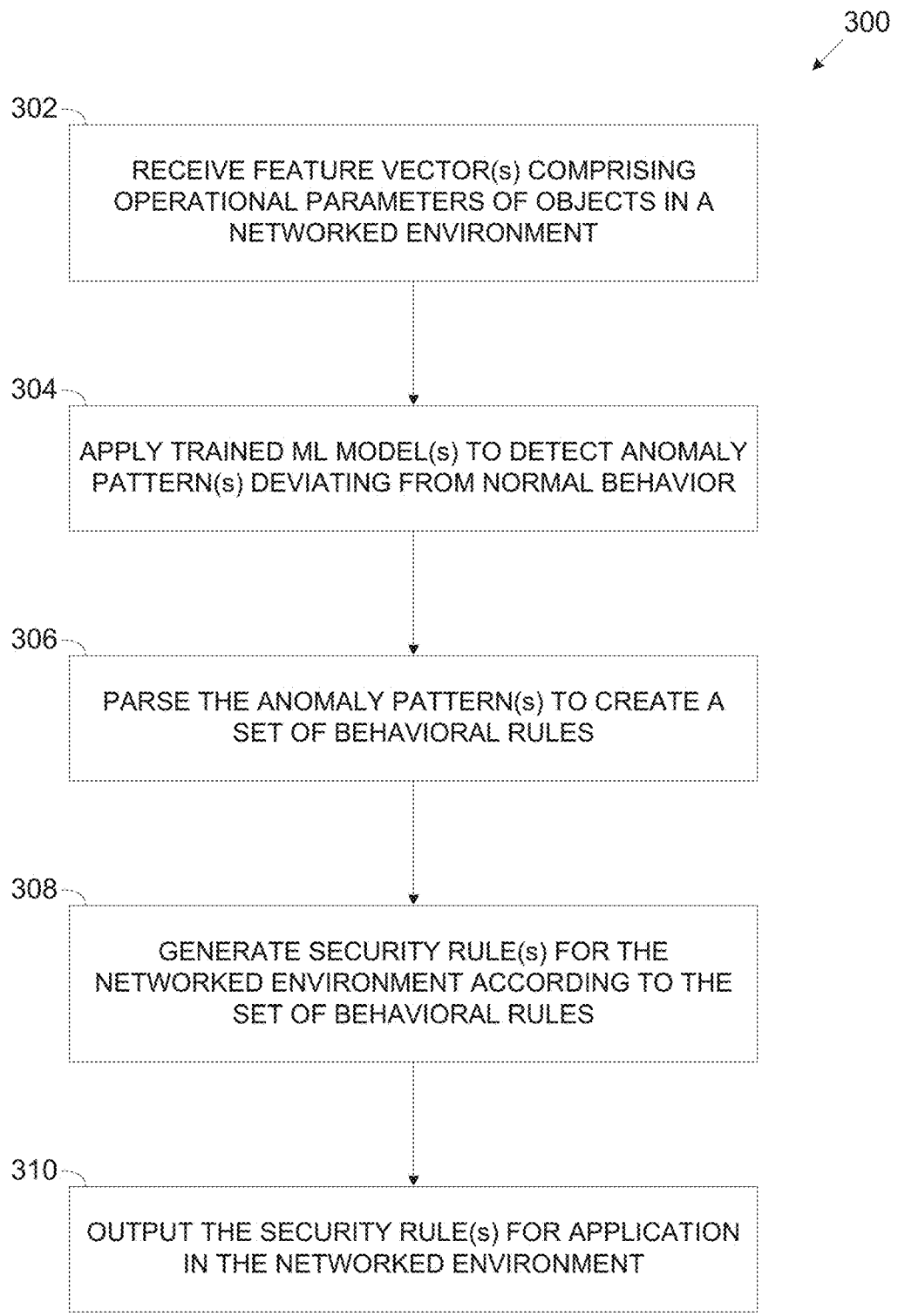
FIG. 3 is a flowchart of an exemplary process of generating security rules for a networked environment based on anomalies detected in the networked environment using a trained ML model, according to some embodiments of the present invention.

Reference is now made to FIG. 3, which is a flowchart of an exemplary process of generating security rules for a networked environment based on anomalies detected in the networked environment using a trained ML model, according to some embodiments of the present invention.

Figure 4:
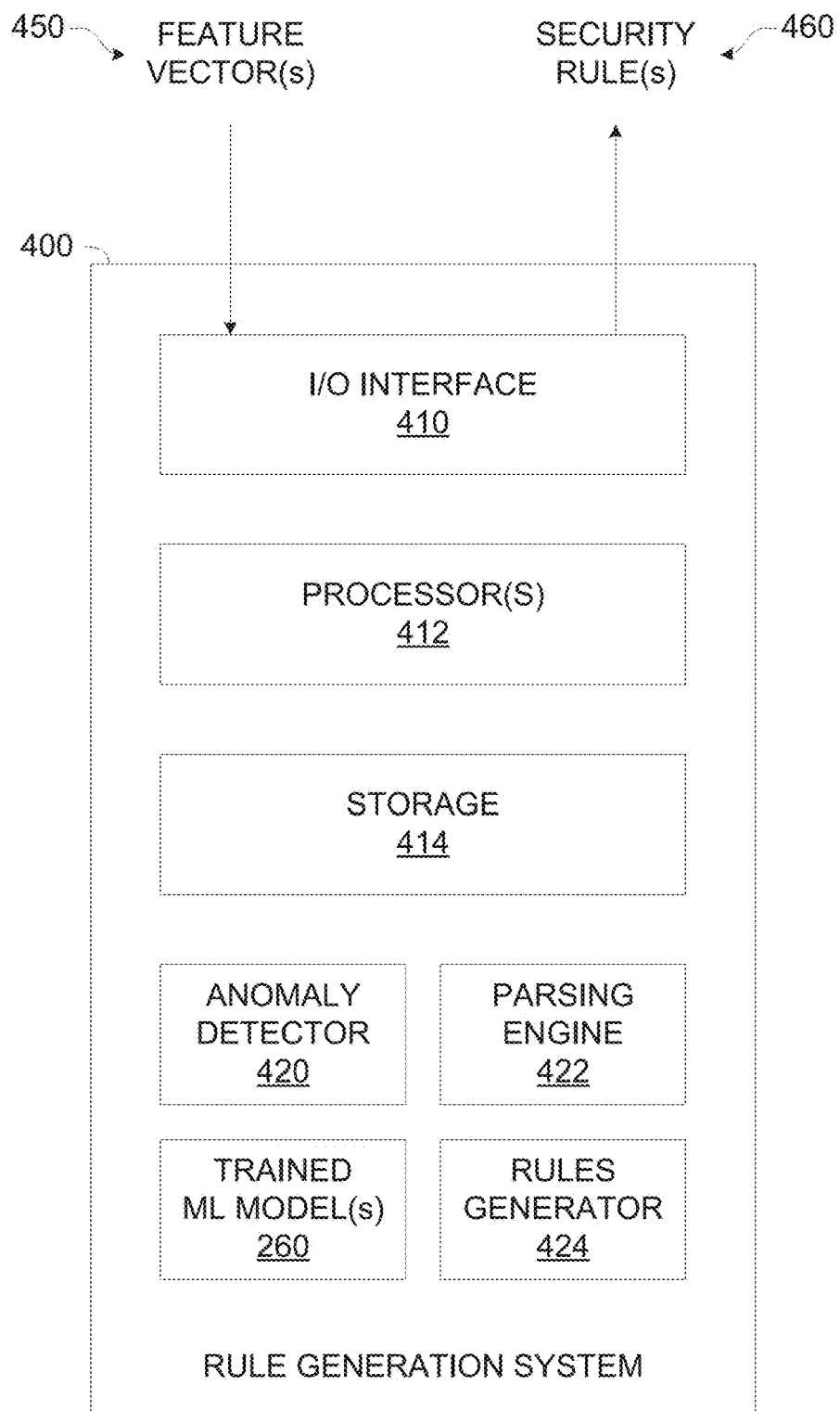
FIG. 4 is a schematic illustration of an exemplary system for generating security rules for a networked environment based on anomalies detected in the networked environment using a trained ML model, according to some embodiments of the present invention.

Reference is also made to FIG. 4, which is a schematic illustration of an exemplary system for generating security rules for a networked environment based on anomalies detected in the networked environment using a trained ML model, according to some embodiments of the present invention.

An exemplary process 300 may be executed by an exemplary rule generation system 400 to generate security rules which may be applied in the networked environment based on anomaly patterns detected in the networked environment by one or more trained ML models such as the ML model 260 which are trained to learn normal operation and/or behavior of the networked environment and may thus detect and/or identify anomaly patterns deviating from the normal behavior patterns.

The rule generation system 400 may comprise an Input/Output (I/O) interface 410 such as the I/O interface 210, a processor(s) 412 such as the processor(s) 212 for executing a process such as the process 300 and a storage 414 such as the storage 214 for storing code (program store) and/or data.

As described for the I/O interface 210, the I/O interface 410 may comprise one or more wired and/or wireless interfaces, and/or one or more wired and/or wireless network interfaces.

Via the I/O interface 410, the rule generation system 400 may receive one or more trained ML models 260. Moreover, via the I/O interface 410, the rule generation system 400 may receive one or more feature vectors 450 comprising features relating to the networked environment which are similar to the feature vectors 250 with the exception that they were not previously seen by the trained ML model(s) 260. Via the I/O interface 410, the rule generation system 400 may further output one or more security rules generated based on one or more anomalies detected in the networked environment by the trained ML model(s) 260.

The processor(s) 412, homogenous or heterogeneous, may include one or more processing nodes arranged for parallel processing, as clusters and/or as one or more multi core processor(s). The processor(s) 212 may execute one or more software modules each comprising a plurality of program instructions stored in a non-transitory medium such as the storage 414 and executed by one or more processors such as the processor(s) 412. The processor(s) 412 may further include, integrate and/or utilize one or more hardware modules available in the training system 200, for example, a circuit, a component, an IC, an ASIC, an FPGA, a DSP, a GPU, an AI accelerator and/or the like. The processor(s) 412 may execute one or more functional modules utilized by one or more software modules, one or more of the hardware modules and/or a combination thereof for executing the process 100. For example, the processor(s) 412 may execute the trained ML model(s) 260, an anomaly detector 420, a parsing engine 422, and/or a rules generator 424 for jointly executing the process 300.

Optionally, the rule generation system 400, the trained ML model(s) 260, the anomaly detector 420, the parsing engine 422, and/or the rules generator 424 may be provided, executed and/or utilized at least partially by one or more cloud computing services, for example, IaaS, PaaS, SaaS and/or the like provided by one or more cloud infrastructures and/or services such as, for example. Amazon AWS, Google Cloud, Microsoft Azure and/or the like.

As shown at 302, the process 300 starts with the rule generation system 400, for example, the anomaly detector 420 receiving one or more feature vectors 450 comprising features expressing one or more operational parameters (values) captured for one or more of the objects of the networked environment.

As shown at 304, the anomaly detector 420 may apply the trained ML model(s) 260 to analyze the received feature vector(s) 450 in order to detect one or more anomaly patterns in the networked environment.

Since the trained ML model(s) 260 are learned to identify normal behavior and/or operation patterns typical to the networked environment, the trained ML model(s) 260 analyzing the feature vector(s) 450, which are new and previously unseen, may detect one or more anomalies in the normal behavior. For example, the trained ML model(s) 260 may detect one or more anomaly patterns deviating from the normal behavior or the normal behavior patterns typical to the networked environment as learned by the trained ML model(s) 260.

For example, assuming that during the unsupervised training the ML model(s) 260 was structured to cluster the feature vectors in one or more clusters corresponding to normal behavior patterns detected in the networked environment. In such case, when unable to classify the received feature vector(s) to one of the normal behavior clusters, the trained ML model(s) 260 may determine that the received feature vector(s) may be indicative of an anomaly in the networked environment.

The trained ML model(s) 260 may further identify a pattern of the anomaly and generate an anomaly pattern accordingly which may be expressed by one or more values of the operational parameters which deviate from their normal operation values.

As shown at 306, the rule generation system 400, for example, the parsing engine 422 may parse the anomaly pattern(s) detected by the trained ML model(s) 260 to create a set of behavioral rules expressing, representing and/or demonstrating each detected anomaly pattern.

Optionally, the set of behavioral rules created by the parsing engine 422 for one or more of the detected anomaly pattern(s) may further include a sequence of the behavioral rules of the set in order to create an ordered set in which the behavioral rules are ordered according to one or more parameters, for example, timing (i.e., time of occurrence), priority, significance and/or the like.

The parsing engine 422 may apply one or more methods, techniques and/or algorithms for parsing each of the anomaly pattern(s).

For example, the parsing engine 422 may traverse each anomaly pattern through a tree-like model constructed of a plurality of nodes arranged hierarchically in a plurality levels starting from a top most root node and extending down to a plurality of bottom most leaf nodes.

Each of the plurality of nodes may define a respective condition applicable for one or more attributes of (potential) anomaly patterns traversed down the tree-like model, specifically of values of one or more of the operational parameters included, expressed and/or defined by the anomaly patterns. Propagation from one node (source node), specifically from a higher level node to one or more next lower level nodes (destination nodes) may be defined by an outcome of the condition defined by the source node where the outcome may typically include true or false. The tree-like model may therefore include a plurality of branches each representing a respective path from the root node to a respective one of the plurality of leaf nodes.

As such, while traversing the anomaly pattern down the tree-like mode and traversing the nodes, the parsing engine 422 may apply to the anomaly pattern the condition defined by each traversed node starting from the root node and may advance to one or more next level nodes based on the outcome of the condition until reaching one or more of the leaf nodes of the tree-like model.

The parsing engine 422 may then derive and/or infer the set of behavioral rules expressing the anomaly pattern from the nodes traversed by the anomaly pattern along the path through one or more of the branches of the tree-like model. In particular, the parsing engine 422 may derive the set of behavioral rules from the conditions defined by the traversed nodes and the outcomes to these conditions.

As shown at 308, the rule generation system 400, for example, the rules generator 424 may generate one or more security rules for the networked environment according to one or more sets of behavior rules to expressing and/or representing one or more of the detected anomaly patterns.

Specifically, the rules generator 424 may generate the security rule(s) according to the conditions of the nodes traversed in the tree-like model. The security rule(s) may thus define the anomaly pattern according to the outcomes of the conditions of the nodes traversed by the anomaly pattern through the tree-like model as expressed by the set of behavioral rule(s).

The security rules may be further configured to initiate one or more actions and/or operations in response to detection of the anomaly pattern(s). For example, one or more of the security rules may define initiating an alert to inform one or more human users and/or automate systems of the detected anomaly pattern(s). In another example, one or more of the security rules may define initiating one or more actions to limit, prevent and/or isolate potential security breaches which may be determined, estimated, assumed and/or derived based on the detected anomaly pattern(s).

As shown at 310, the rule generation system 400 may output the generated rule(s) which may be applied to increase security of the networked environment. For example, one or more of the security rule(s) may be translated to settings in one or more network equipment devices, apparatuses and/or systems deployed in the networked environment, for example, a router, a switch, a firewall server and/or the like. For example, switch settings may be derived from the security rule(s) to dictate limiting and/or preventing connections between one or more certain network nodes. In another example, firewall settings derived from the security rule(s) may dictate blocking network traffic originating from one or more certain Unified Resource Locators (URLs). In another example, network management settings derived from the security rule(s) may dictate preventing one or more certain users from accessing one or more of the resources of the networked environment during certain times.

The security rules applied in the network equipment device(s) may be combined to counter multiple anomaly patterns each forming a respective anomaly region which may be disparate from each other or at least partially overlapping. The combined security rules may therefore serve to counter the combined anomaly regions shaped by the multitude of anomaly patterns.

Moreover, one or more of the security rules may be organized, defined, evaluated, allowed, denied, added and/or removed to the network equipment device(s) based on classification of anomaly and safe profiles. For example, a first anomaly profile may define one or more first anomaly patterns for which one or more first security rules are generated while a second anomaly profile may define one or more second anomaly patterns for which one or more second security rules are generated. In case the first anomaly profile is applied, the first security rule(s) may be applied in the network equipment device(s), for example, a firewall. However, in case the second anomaly profile is applied, the second security rule(s) may be applied in the firewall. Moreover, in case both the first and second anomaly profiles are applied ion the networked environment, both the first security rule(s) and second security rule(s) may be applied in the firewall.

Furthermore, one or more of the security rules may define that one or more of the anomaly patterns should be further tracked, further checked, further investigated and/or the like. The security rule(s) may therefore optionally defined initiating one or more actions based on cumulative detection of one or more anomaly patterns in the networked environment. For example, a certain security rule may define initiating a certain action, for example, generate an alert, block a connection, pause an access, adjust threat severity, send fake response and/or the like in case the number of anomalies of a certain type exceeds a certain predefined and/or dynamically set threshold.

The anomaly patterns, specifically the set of rules representing the anomaly patterns may be difficult for human users to comprehend, grasp and/or understand. The rule generation system 400, for example, the rules generator 424 may therefore optionally further construct a visual representation of one or more sets of behavioral rules representing one or more of the anomaly patterns detected in the networked environment in order to visualize the anomaly pattern one or more users, for example, an IT person, a network manager and/or the like.

Following is an example of process 300 executed in a networked environment to generate one or more security rules based on detecting an anomaly and parsing it to generate a representative set of behavioral rules which may be applied in network equipment deployed in the networked environment and may be further visualized to one or more human users.

Exemplary features expressing operational parameters captured in an exemplary networked environment are listed in table 1 below.

TABLE 1

| Feature | Description |
| --- | --- |
| count | # of connections to the same host as the current connection in the past two seconds |
| serror_rate | % of connections that have "SYN" errors |
| rerror_rate | % of connections that have "REJ" errors |
| same_srv_rate | % of connections to the same service |
| diff_srv_rate | % of connections to different services |
| srv_count | # of connections to the same service as the current connection in the past two seconds |
| srv_serror_rate | % of connections that have "SYN" errors |
| srv_rerror_rate | % of connections that have "REJ" errors |
| srv_diff_host_rate | % of connections to different services |
| dst_host_srv_count | # of connections to destination host service |
| dst_host_srv_diff_host_rate | % of connections to destination host service among different hosts |

The anomaly detector applying the trained ML model(s) to one or more feature vector comprising feature values captured in the networked environment for one or more of the features listed in table 1, may detect an anomaly pattern deviating from the normal behavior of the networked environment as learned by the ML model(s).

Figure 5:
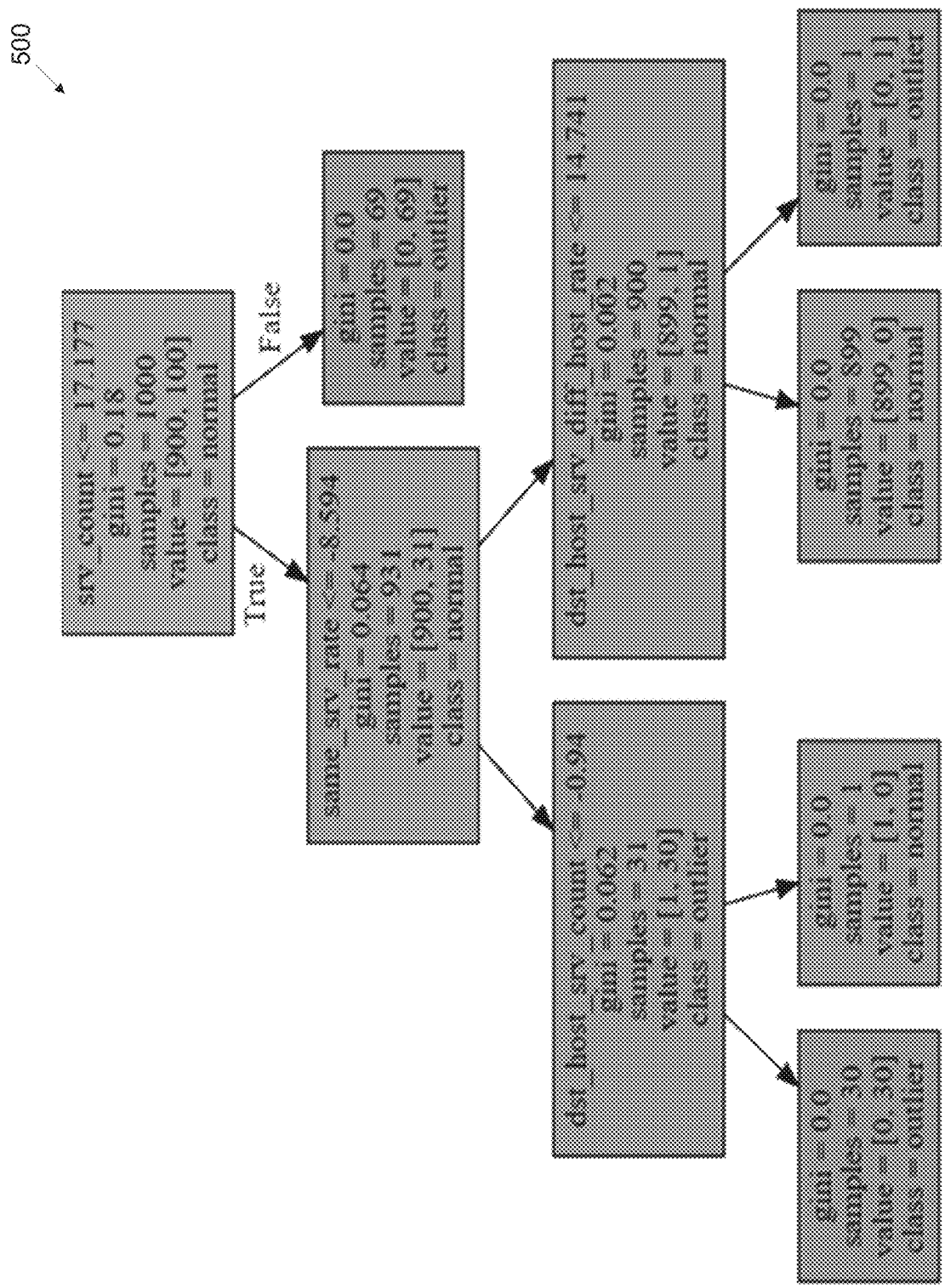
FIG. 5 is a schematic illustration of a tree-like model used to parse anomaly patterns detected a networked environment to create a set of behavioral rules, according to some embodiments of the present invention.

The parsing engine 422 may traverse the detected anomaly pattern through the tree-like model to create a set of behavioral rules representing the anomaly pattern Reference is now made to FIG. 5, which is a schematic illustration of a tree-like model used to parse anomaly patterns detected a networked environment to create a set of behavioral rules, according to some embodiments of the present invention.

An exemplary tree-like model 500 may comprise a plurality of node hierarchically arranged in a plurality levels starting from a top most root node and extending down to a plurality of bottom most leaf nodes. Each of the nodes may define a respective condition.

Wherein the variable "gini" designates a splitting criteria which measure quality of a split for the Gini impurity, the variable "samples" designates a number of rows (samples) of the data in the node, and the variable "value" designates a number of samples per class in the node. For example, an exemplary expression value=[900,100] means that 900 samples from class_0 may indicate normal behavior while 100 samples from class_1 may be an outlier which may represent an anomaly pattern.

A parsing engine such as the parsing engine 422 may traverse the detected anomaly pattern through the tree-like model 500 and create a set of behavioral rules accordingly expressing the detected anomaly pattern.

Based on the set of behavioral rules created by the parsing engine 422, a rules generator such as the rules generator 424 may generate a certain security rule directed to define the detected anomaly pattern the anomaly and initiate one or more actions to alert, counter, limit the anomaly or even prevent it altogether. The certain security rule may comprise the following expression expressing the detected anomaly pattern:

[srv_count<17.177 & same_srv_rate>−8.594 & dst_host_srv_count>−0.94]

Figure 6:
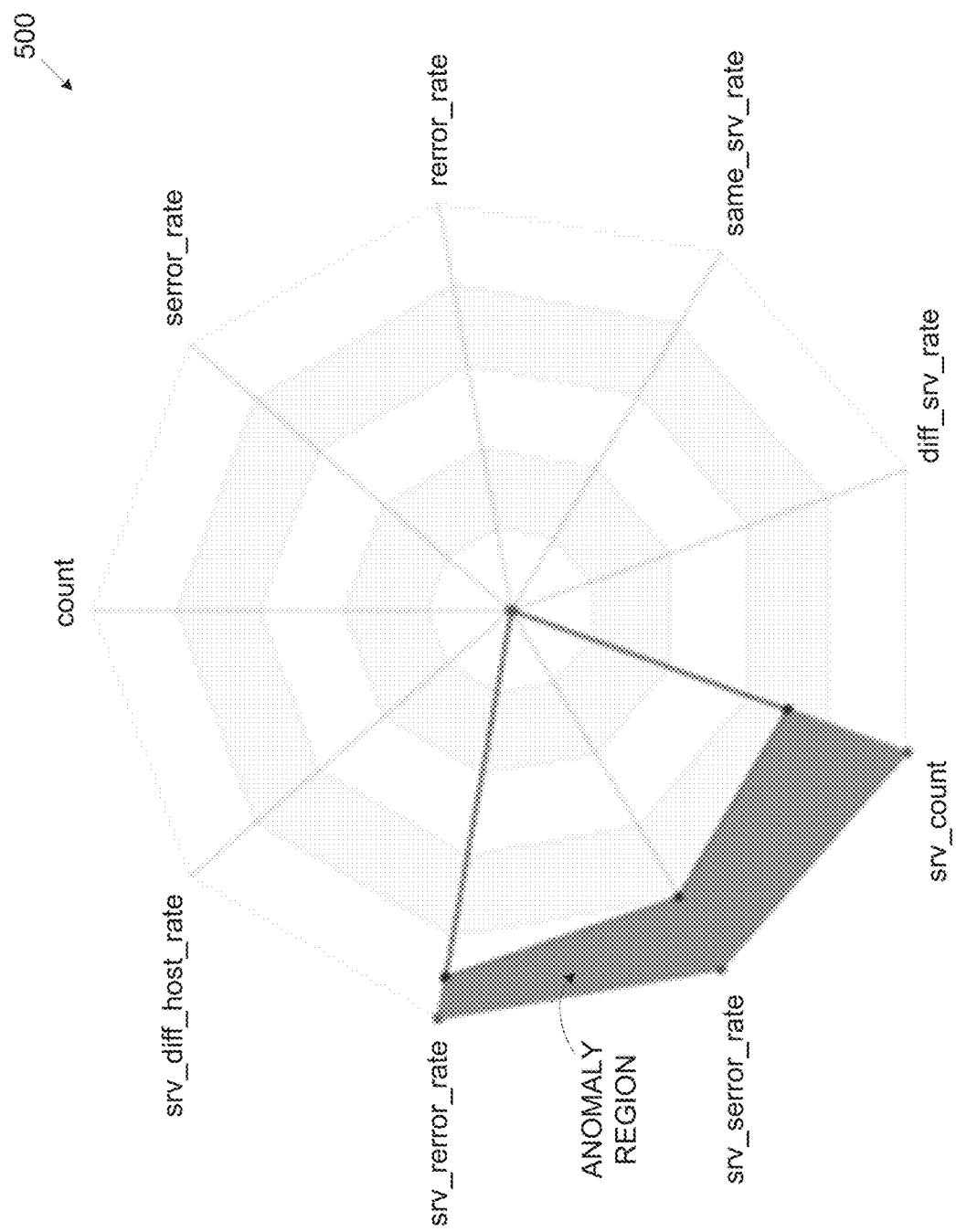
FIG. 6 is a schematic illustration of an exemplary feature map illustrating normal and anomalous behavior learned by an ML model for a networked environment, according to some embodiments of the present invention.

Reference is now made to FIG. 6, which is a schematic illustration of an exemplary feature map illustrating normal and anomalous behavior learned by an ML model for a networked environment, according to some embodiments of the present invention.

An exemplary feature map 600 may be generated by a rule generation system such as the rule generation system 400 executing a rules generator such as the rules generator 424 to visualize the anomaly pattern detected in an exemplary networked environment. The feature map 600 maps a plurality of events to create an event distribution based on the exemplary subset of features presented in table 1. As seen, the feature map may visualize the anomaly region of the detected anomaly pattern expressed in the terms of the subset of features such that the anomaly region and/or distribution may be comprehensible to human users.

As seen in feature map 600, mapping the anomaly pattern in a two dimensional and/or a three dimensional map may significantly enhance visibility, comprehension and understanding of the region, distribution and/or extent of the detected anomaly(s) to one or more human users who may be limited in their ability to effectively visualize the distribution of the features and determine which feature sets may represent anomalies compared to the feature sets which may represent normal behavior of the networked environment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms ML models, neural network, clustering algorithms and classification algorithms are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of automatically generating security rules for a networked environment based on anomalies identified using Machine Learning (ML), comprising:
    using at least one processor for:
    receiving at least one feature vector comprising a plurality of operational parameters of a plurality of objects of a networked environment;
    identifying at least one anomaly pattern in the networked environment by applying at least one trained ML model to the at least one feature vector, the at least one ML model is trained to identify patterns deviating from normal behavior of the plurality of objects, wherein the at least one anomaly pattern is indicative of at least one previously unknown threat to the networked environment;
    generating a set of behavioral rules that represent the identified at least one anomaly pattern by parsing the identified at least one anomaly pattern, wherein parsing the identified at least one anomaly pattern is performed by traversing the identified at least one anomaly pattern through a tree-like model;
    generating at least one security rule for the networked environment according to the set of behavior rules;
    wherein the at least one security rule is applied by one or more network access equipment to increase security of the networked environment; and
    generating, from the set of behavioral rules, a visual n-dimensional feature map describing an anomaly region of the detected anomaly patterns, wherein n is an integer greater than two.

2. The method of claim 1, wherein the set of behavioral rules further defines a sequence of the behavioral rules of the set.

3. The method of claim 1, wherein each of the plurality of objects is a member of a group consisting of: an application, a process, a thread, a network node, a user, a network connection, a network packet, and a log file.

4. The method of claim 1, wherein the at least one ML model is an unsupervised learning ML model trained using a training dataset comprising a plurality of feature vectors each comprising a plurality of operational parameters of the plurality of objects expressing normal behavior of the plurality of objects.

5. The method of claim 4, wherein the plurality of operational parameters of the plurality of objects expressing normal behavior are captured in the networked environment during a predefined time period.

6. The method of claim 1, wherein the at least one ML model is further trained online after deployed to identify at least one anomaly pattern in the networked environment.

7. The method of claim 1, wherein the tree-like model is constructed of a plurality of nodes arranged hierarchically in a plurality levels from a top most root node to a plurality of bottom most leaf nodes, the tree-like model includes a plurality of branches each representing a respective path traversed from the root node to a respective one of the plurality of leaf nodes, each of the plurality of nodes defines a respective condition applicable for at least one attribute of the at least one anomaly pattern.

8. The method of claim 7, wherein moving from a respective node of a respective level to at least one node of a next lower level is defined according to an outcome of the respective condition defined by the respective node, the outcome is a member of a group consisting of: true, false, further track, further check and further investigate.

9. The method of claim 7, wherein the set of behavioral rules that represent the anomaly pattern is derived from the nodes of the path traversed for the anomaly pattern along at least one branch of the tree-like model.

10. A system for automatically generating security rules for a networked environment based on anomalies identified using Machine Learning (ML), comprising:
    at least one processor configured to execute a code, the code comprising:
    code instructions to receive at least one feature vector comprising a plurality of operational parameters of a plurality of objects of a networked environment;
    code instructions to identify at least one anomaly pattern in the networked environment by applying at least one trained ML model to the at least one feature vector, the at least one ML model is trained to identify patterns deviating from normal behavior of the plurality of objects, wherein the at least one anomaly pattern is indicative of at least one previously unknown threat to the networked environment;
    code instructions to parse the identified at least one anomaly pattern traversing the at least one anomaly pattern through a tree-like model to generate a set of behavioral rules that represent the identified at least one anomaly pattern;
    code instructions to generate at least one security rule for the networked environment according to the set of behavior rules;
    wherein the at least one security rule is applied to increase security of the networked environment; and
    code instructions to generate, from the set of behavioral rules, a visual n-dimensional feature map describing an anomaly region of the detected anomaly patterns, wherein n is an integer greater than two.

11. The system of claim 10, wherein the set of behavioral rules further defines a sequence of the behavioral rules of the set.

12. The system of claim 10, wherein each of the plurality of objects is a member of a group consisting of: an application, a process, a thread, a network node, a user, a network connection, a network packet, and a log file.

13. The system of claim 10, wherein the at least one ML model is an unsupervised learning ML model trained using a training dataset comprising a plurality of feature vectors each comprising a plurality of operational parameters of the plurality of objects expressing normal behavior of the plurality of objects.

14. The system of claim 13, wherein the plurality of operational parameters of the plurality of objects expressing normal behavior are captured in the networked environment during a predefined time period.

15. The system of claim 10, wherein the at least one ML model is further trained online after deployed to identify at least one anomaly pattern in the networked environment.

16. The system of claim 10, wherein the tree-like model is constructed of a plurality of nodes arranged hierarchically in a plurality levels from a top most root node to a plurality of bottom most leaf nodes, the tree-like models includes a plurality of branches each representing a respective path traversed from the root node to a respective one of the plurality of leaf nodes, each of the plurality of nodes defines a respective condition applicable for at least one attribute of the at least one anomaly pattern.

17. The system of claim 16, wherein moving from a respective node of a respective level to at least one node of a next lower level is defined according to an outcome of the respective condition defined by the respective node, the outcome is a member of a group consisting of: true, false, further track, further check and further investigate.

18. The system of claim 16, wherein the set of behavioral rules that represent the anomaly pattern is derived from the nodes of the path traversed for the anomaly pattern along at least one branch of the tree-like model.

* * * * *